(12) United States Patent
Hirokawa (10) Patent No.: US 10,102,455 B2
(45) Date of Patent: Oct. 16, 2018

(54) METHOD, SYSTEM, AND APPARATUS FOR INFORMATION PROCESSING, PROGRAM, SERVER, AND CONTENT DISTRIBUTION METHOD

(71) Applicant: Tatsuma Hirokawa, Kanagawa (JP)

(72) Inventor: Tatsuma Hirokawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1 day.

(21) Appl. No.: 14/663,995

(22) Filed: Mar. 20, 2015

(65) Prior Publication Data

US 2015/0278643 A1    Oct. 1, 2015

(30) Foreign Application Priority Data

Mar. 26, 2014   (JP) .................................. 2014-063469

(51) Int. Cl.
    *G06K 15/00*      (2006.01)
    *G06F 3/12*      (2006.01)

(52) U.S. Cl.
    CPC ............. *G06K 15/002* (2013.01); *G06F 3/12* (2013.01)

(58) Field of Classification Search
    CPC ................................ G06K 15/002; G06F 3/12
    USPC ....................................................... 358/1.15
    See application file for complete search history.

(56) References Cited

U.S. PATENT DOCUMENTS

| | | | | |
|---|---|---|---|---|
| 6,404,994 B1 * | 6/2002 | Kawai | ............. | G03G 15/04018 |
| | | | | 399/194 |
| 8,335,995 B2 * | 12/2012 | Ohara | ................... | G03G 15/55 |
| | | | | 700/232 |
| 2004/0156068 A1 * | 8/2004 | Yoshida | ............... | G06F 21/608 |
| | | | | 358/1.13 |
| 2010/0241503 A1 * | 9/2010 | Nakashima | ............ | G06Q 30/02 |
| | | | | 705/14.19 |
| 2011/0035441 A1 * | 2/2011 | Osuga | ................. | H04L 67/2842 |
| | | | | 709/203 |
| 2013/0128297 A1 * | 5/2013 | Yasui | ..................... | G06K 15/02 |
| | | | | 358/1.13 |

FOREIGN PATENT DOCUMENTS

| | | |
|---|---|---|
| JP | 2003-152937 | 5/2003 |
| JP | 2010-218489 | 9/2010 |
| JP | 2013-125147 | 6/2013 |

* cited by examiner

*Primary Examiner* — Neil R McLean
*Assistant Examiner* — Darryl V Dottin
(74) *Attorney, Agent, or Firm* — Oblon, McClelland, Maier & Neustadt, L.L.P.

(57) ABSTRACT

An information processing system includes a server configured to distribute content items and an information processing apparatus. The server including a storing unit configured to store, for each of state information identifying a state of the information processing apparatus, one or more the content items associated with the state information. The information processing apparatus includes: an acquisition unit configured to acquire the content items associated with the state information from the server; and a display control unit configured to perform control of displaying the content items associated with the state information indicating a current state of the information processing apparatus.

12 Claims, 7 Drawing Sheets

METHOD, SYSTEM, AND APPARATUS FOR INFORMATION PROCESSING, PROGRAM, SERVER, AND CONTENT DISTRIBUTION METHOD

CROSS-REFERENCE TO RELATED APPLICATIONS

The present application claims priority to and incorporates by reference the entire contents of Japanese Patent Application No. 2014-063469 filed in Japan on Mar. 26, 2014.

BACKGROUND OF THE INVENTION

1. Field of the Invention

The present invention relates generally to methods, systems, and apparatuses for information processing, programs, servers, and content distribution methods.

2. Description of the Related Art

Techniques of displaying a different content item (e.g., information, such as advertisement, to be notified to user) depending on a state of equipment, e.g., a multifunction peripheral (MFP). For example, Japanese Laid-open Patent Application No. 2003-152937 discloses a technique of predicting a usage duration, which is a duration from when a user starts using an image forming apparatus until when the user stops using the same, and displaying an advertisement duration of which does not exceed the predicted usage duration.

However, conventional techniques disadvantageously do not allow content distributors to distribute a different content item depending on a state of equipment.

Therefore, it is desirable to provide methods, systems, and apparatuses for information processing, programs, servers, and content distribution methods capable of distributing a different content item depending on a state of equipment.

SUMMARY OF THE INVENTION

It is an object of the present invention to at least partially solve the problems in the conventional technology.

According to an aspect of the present invention, there is provided an information processing system including a server configured to distribute content items and an information processing apparatus, the server including a storing unit configured to store, for each of state information identifying a state of the information processing apparatus, one or more the content items associated with the state information, and the information processing apparatus including: an acquisition unit configured to acquire the content items associated with the state information from the server; and a display control unit configured to perform control of displaying the content items associated with the state information indicating a current state of the information processing apparatus.

According to another aspect of the present invention, there is provided an information processing apparatus including: an acquisition unit configured to acquire, from a storing unit storing, for each of state information indicating a state of the information processing apparatus, one or more content items associated with the state information, the content items associated with state information; and a display control unit configured to perform control of displaying the content items associated with the state information indicating a current state of the information processing apparatus.

According to still another aspect of the present invention, there is provided an information processing method including: acquiring, from a storing unit storing, for each state information indicating a state of the information processing apparatus, one or more content items associated with the state information, the content items associated with state information; and performing control of displaying the content items associated with the state information indicating a current state of the information processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Although an embodiment example in which information processing apparatus according to an aspect of the present invention is applied to an MFP (multifunction peripheral) is described below, application examples are not limited thereto. Meanwhile, an MFP is an apparatus having at least two of a printer function, a copier function, a scanner function, and a facsimile function.

Figure 1:
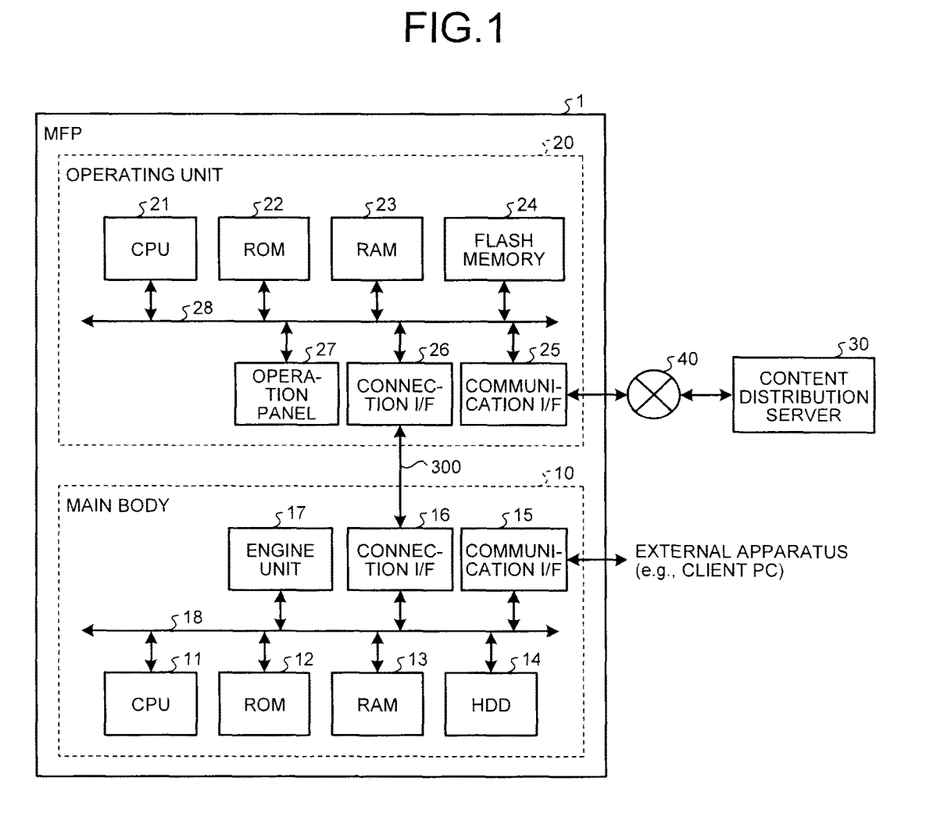
FIG. 1 is a diagram illustrating an example hardware configuration of an MFP according to an embodiment of the present invention.

FIG. 1 is a block diagram illustrating an example hardware configuration of an MFP 1 according to an embodiment. In the example illustrated in FIG. 1, the MFP 1 is connected to a content distribution server 30 via a network 40 such as the Internet. The content distribution server 30 is an apparatus that manages and distributes content items. The content items will be specifically described later. In the present disclosure, the term "content" refers to information to be notified to a user(s) via equipment. Examples of the information include advertisement, advertisement on equipment, in-house notices, and information about the equipment. The content distribution server 30 of the embodiment can be considered as an example of "server" according to aspects of the present invention. An information processing system made up of the MFP 1 and the content distribution server 30 of the embodiment can be considered as an example of "information processing system" according to aspects of the present invention.

As illustrated in FIG. 1, the MFP 1 includes a main body 10 and an operating unit 20. The main body 10 is configured to perform various functions including a copier function, a scanner function, a facsimile function, and a printer function. The operating unit 20 accepts inputs produced by user's operations. The main body 10 and the operating unit 20 are communicably connected to each other via a dedicated communication channel 300. As the communication channel 300, for example, a communication channel conforming to a USB (universal serial bus) standard can be used, but not limited thereto. Any wired or wireless communication channel conforming to a desired standard can be used as the communication channel 300.

The main body 10 is configured to operate in accordance with an input accepted by the operating unit 20. The main body 10 is also configured to carry out communications with an external apparatus such as a client PC (personal computer) and to perform operation in accordance with a command received from the external apparatus.

A hardware configuration of the main body 10 is described below. As illustrated in FIG. 1, the main body 10 includes a CPU 11, a ROM 12, a RAM 13, an HDD (hard disk drive) 14, a communication I/F (interface) 15, a connection I/F 16, and an engine unit 17. These elements are connected to each other via a system bus 18.

The CPU 11 provides centralized control of operations of the main body 10. More specifically, the CPU 11 controls operations of the entire main body 10 by executing program instructions stored in the ROM 12, the HDD 14, or the like by using the RAM 13 as a working area, thereby performing the above-described various functions including the copier function, the scanner function, the facsimile function, and the printer function.

The communication I/F 15 is an interface for communications with the external apparatus such as the client PC (personal computer). The connection I/F 16 is an interface for communications with the operating unit 20 via the communication channel 300.

The engine unit 17 is hardware that performs general information processing and processing, excluding processing for communications, for performing the copier function, the scanner function, the facsimile function, and the printer function. For example, the engine unit 17 may include a scanner (image reading unit) that reads an image of an original document by scanning the original document, a plotter (image forming unit) that performs printing on a sheet medium such as paper, and a facsimile unit that carries out facsimile communications. The engine unit 17 may further include one or more options, e.g., a finisher that sorts out printed sheet media and/or an ADF (automatic document feeder) that automatically feeds original documents to the MFP 1.

A hardware configuration of the operating unit 20 is described below. As illustrated in FIG. 1, the operating unit 20 includes a CPU 21, a ROM 22, a RAM 23, a flash memory 24, a communication I/F 25, a connection I/F 26, and an operation panel 27. These elements are connected to each other via a system bus 28.

The CPU 21 provides centralized control of operations of the operating unit 20. More specifically, the CPU 21 controls operations of the entire operating unit 20 by executing program instructions stored in the ROM 22, the flash memory 24, or the like by using the RAM 23 as a working area, thereby performing various functions, which will be described later, such as a function of displaying information (image) in accordance with an input accepted from a user.

The communication I/F 25 is an interface for communications with the content distribution server 30 via the network 40. The connection I/F 26 is an interface for communications with the main body 10 via the communication channel 300.

The operation panel 27 accepts various inputs produced by user's operations and displays a variety of information. Examples of the information include information related to an accepted input, information indicating an operating state of the MFP 1, and current settings. In the embodiment, the operation panel 27 is implemented as a liquid crystal device (LCD) having a touch panel function. However, implementation examples of the operation panel 27 are not limited thereto. For example, the operation panel 27 may be implemented as an organic EL (electro luminescence) display device having a touch panel function. The operation panel 27 may include, in addition to or in lieu of the display device, an operating unit such as a hardware key or an indicator such as a lamp.

Figure 2:
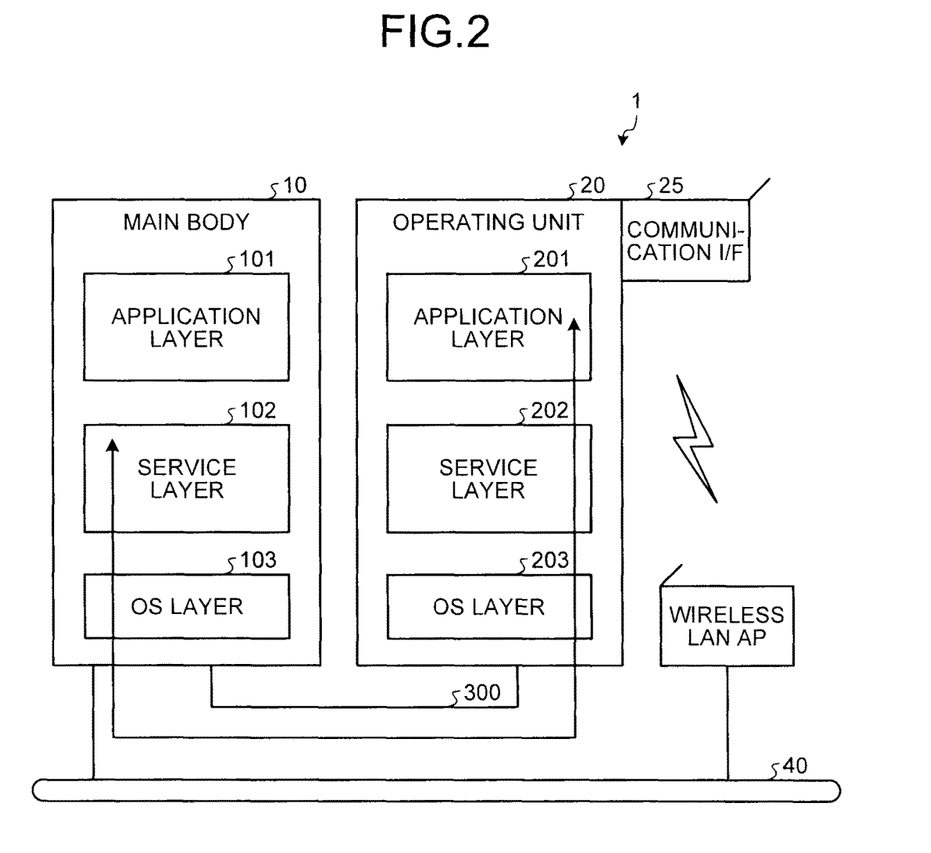
FIG. 2 is a diagram illustrating an example software configuration of the MFP.

A software configuration of the MFP 1 is described below. FIG. 2 is a schematic diagram illustrating an example software configuration of the MFP 1. As illustrated in FIG. 2, the main body 10 includes an application layer 101, a service layer 102, and an OS (operating system) layer 103. The application layer 101, the service layer 102, and the OS layer 103 are implemented in various software programs stored in the ROM 12, the HDD 14, or the like. The CPU 11 executes the software programs (hereinafter, "software"), thereby performing various functions.

The software of the application layer 101 is application software (hereinafter, sometimes referred to as "App") that performs predetermined functions by utilizing hardware resources. Examples of the App include a copier App for performing the copier function, a scanner App for performing the scanner function, a facsimile App for performing the facsimile function, and a printer App for performing the printer function.

The software of the service layer 102 is software interposed between the application layer 101 and the OS layer 103 to provide the Apps with interface that allows the Apps to utilize hardware resources of the main body 10. More specifically, the software of the service layer 102 is software that performs a function of accepting operating requests requesting to utilize the hardware resources and arbitrating the operation requests. Examples of the operating requests to be accepted by the service layer 102 include a request requesting reading using the scanner and a request requesting printing using the plotter.

The service layer 102 provides the interface function not only to the application layer 101 of the main body 10 but also to an application layer 201 of the operating unit 20. Accordingly, (the Apps of) the application layer 201 of the operating unit 20 can also perform functions utilizing the hardware resources (e.g., the engine unit 17) of the main body 10 by way of the interface function provided by the service layer 102.

The software of the OS layer 103 is basic software (operating system) that performs basic functions for controlling the hardware resources of the main body 10. The software of the service layer 102 converts a request, accepted from one of the various Apps, requesting to utilize the hardware resources into a command interpretable by the OS layer 103 and passes the command to the OS layer 103.

The software of the OS layer 103 executes the command, thereby causing the hardware resources to operate as requested by the App.

Similarly, the operating unit 20 includes the application layer 201, a service layer 202, and an OS layer 203. Layer structure of the application layer 201, the service layer 202, and the OS layer 203 of the operating unit 20 is similar to that of the main body 10. It should be noted that functions provided by Apps of the application layer 201 and types of operating requests acceptable by the service layer 202 of the operating unit 20 differ from those of the main body 10. Each of the Apps of the application layer 201 may be software that performs a predetermined function(s) by utilizing hardware resources of the operating unit 20. However, the Apps of the application layer 201 are mainly software for performing UI (user interface) functions for operations and displays related to the functions (the copier function, the scanner function, the facsimile function, and the printer function) provided by the main body 10.

Figure 3:
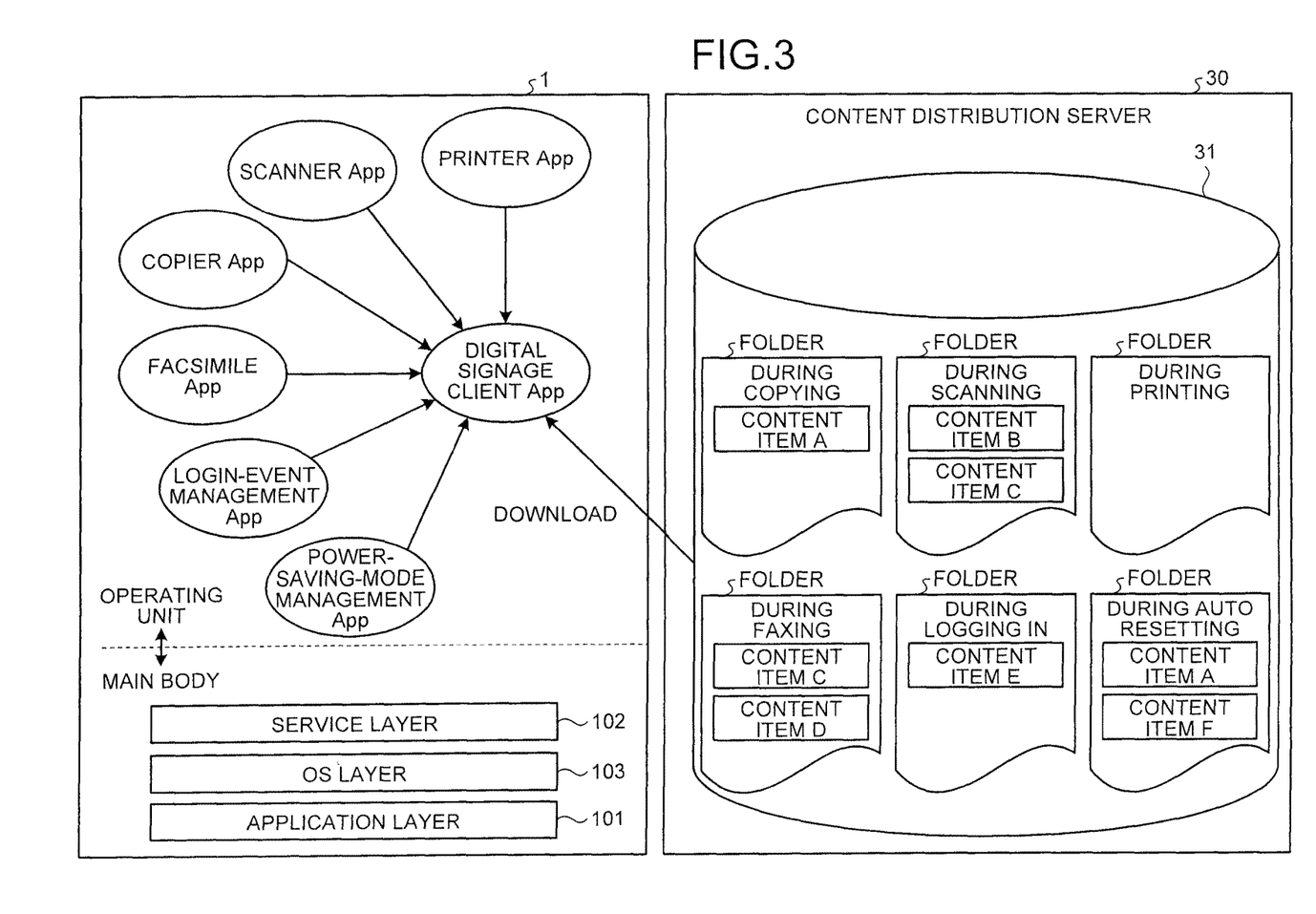
FIG. 3 is a diagram schematically illustrating Apps of an operating unit and content items held in a content distribution server.

As illustrated in FIG. 3, the Apps of the application layer 201 of the operating unit 20 may include, but not limited to, a printer App that performs a UI function for operations and displays related to the printer function, a scanner App that performs a UI function for operations and displays related to the scanner function, a copier App that performs a UI function for operations and displays related to the copier function, a facsimile App that performs a UI function for operations and displays related to the facsimile function, a power-saving-mode management App that performs a UI function for configuring settings and providing displays related to recovery from a power-save mode, a login-event management App for configuring settings and providing displays related to a login event, and a digital signage client App that performs a UI function for displaying a content item(s) associated with a state, which depends on a user operation or an operation performed by the MFP 1, of the MFP 1. The digital signage client App, which will be described in detail later, performs a function of acquiring (downloading) the content item(s) associated with the state of the MFP 1 from the content distribution server 30 and displaying the content item(s).

Referring back to FIG. 2, the software configuration of the MFP 1 is further described below. In the embodiment, the software of the OS layer 103 of the main body 10 and the software of the OS layer 203 of the operating unit 20 differ from each other to maintain functional independence. Hence, the main body 10 and the operating unit 20 operate on distinct operating systems independently of each other. For example, the main body 10 and the operating unit 20 may be configured in such a manner that Linux (registered trademark) is used as the software of the OS layer 103 of the main body 10, while Android (registered trademark) is used as the software of the OS layer 203 of the operating unit 20.

As described above, in the MFP 1 of the embodiment, the main body 10 and the operating unit 20 operate on the distinct operating systems. Accordingly, communications between the main body 10 and the operating unit 20 are carried out as communications between distinct apparatuses rather than as inter-process communication within a single apparatus. The communications between the main body 10 and the operating unit 20 include transmission (command forwarding) of an input (i.e., a command from a user) accepted by the operating unit 20 to the main body 10, notification of an event from the main body 10 to the operating unit 20, and the like. More specifically, the operating unit 20 forwards the command to the main body 10 so that the operating unit 20 can use the functions of the main body 10. Examples of the event to be notified from the main body 10 to the operating unit 20 include progress of an operation performed by the main body 10 and settings configured on the main body 10.

In the embodiment, electric power is supplied to the operating unit 20 from the main body 10 via the communication channel 300. Accordingly, power supply control of the operating unit 20 can be performed separately (independently of) power supply control of the main body 10.

Content items held in the content distribution server 30 are described below. FIG. 3 is a diagram schematically illustrating the content items held in the content distribution server 30. The content distribution server 30 manages content items to be distributed by the content distribution server 30. In the example illustrated in FIG. 3, the content distribution server 30 includes a storing unit 31 that stores content items in such a manner that one or more content items are associated with each of state information records indicating a state of the MFP 1. The state information record can be considered as information that depends on a user operation or an operation performed by the MFP 1. More specifically, the storing unit 31 has a plurality of folders (storage areas) in a one-to-one correspondence with the plurality of state information records. In each of the folders, one or more content items associated with a corresponding one of the state information records are stored. For example, content items may be stored in the folders in the following manner. A name (folder name) "during copying" is assigned to a folder corresponding to a state information record (in the example illustrated in FIG. 3, the state information record named "during copying") indicating a state in which the copier App is executed. One or more content items (in the example illustrated in FIG. 3, "content item A") that are desired to be displayed during copying are stored in the folder. Similarly, a name "during scanning" is assigned to a folder corresponding to a state information record (in the example illustrated in FIG. 3, the state information record named "scanning") indicating a state in which the scanner App is executed. One or more content items (in the example illustrated in FIG. 3, "content item B" and "content item C") that are desired to be displayed during scanning are stored in the folder.

Although the folders are named same as the corresponding state information records in the example illustrated in FIG. 3, folder names are not limited thereto. As described above, the content distribution server 30 has folders on a state-by-state basis of the MFP 1 in the storing unit 31. One or more content items to be displayed during execution of a corresponding App are stored in each of the folders. Accordingly, a user(s) of the content distribution server 30 can place a content item(s) that are desirably displayed during execution of the respective Apps of the MFP 1 in the corresponding folders as desired.

Figure 4:
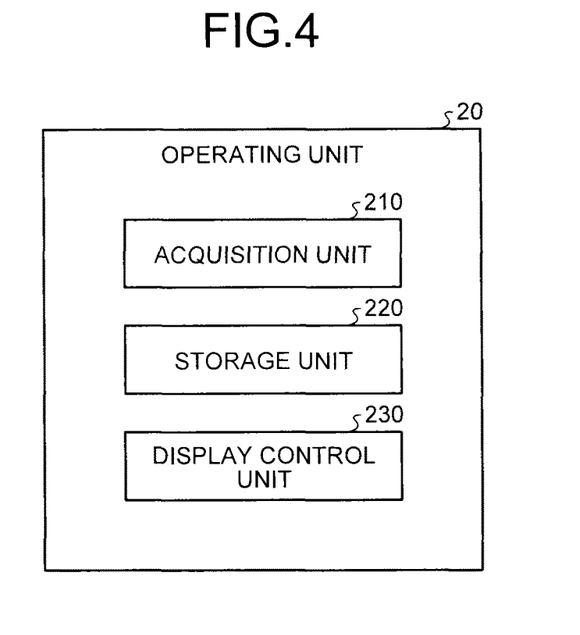
FIG. 4 is a diagram illustrating an example functional configuration of the operating unit.

Functions provided by the above-denoted digital signage client App are described below. FIG. 4 is a diagram illustrating an example functional configuration of the operating unit 20. For convenience of description, FIG. 4 mainly illustrates functions related to the digital signage client App; however, functions of the operating unit 20 are not limited thereto.

As illustrated in FIG. 4, the operating unit 20 includes an acquisition unit 210, a storage unit 220, and a display control unit 230. In the embodiment, the operating unit 20 can be considered as an example of "information processing apparatus" according to aspects of the present invention. The acquisition unit 210, the storage unit 220, and the display control unit 230 may be implemented in the CPU 21 by executing program instructions (the digital signage client App) or, alternatively, may be implemented in a dedicated hardware circuit (e.g., a semiconductor integrated circuit).

Figure 5:
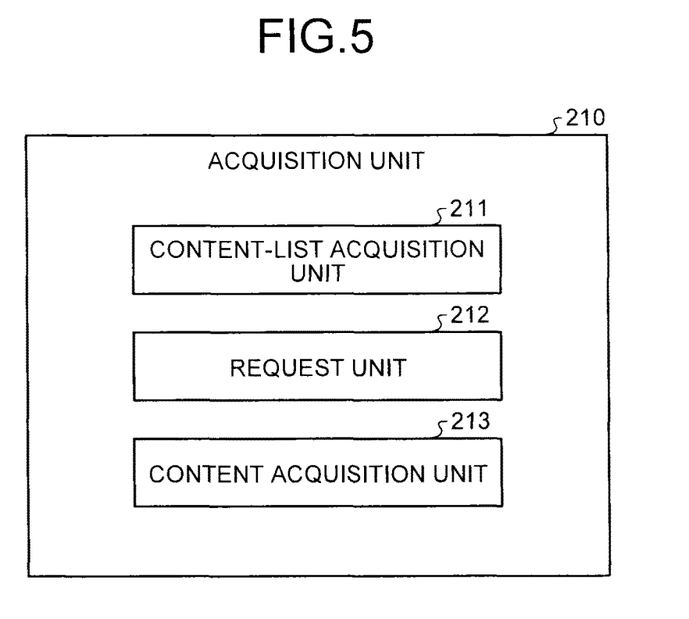
FIG. 5 is a diagram illustrating in detail an example functional configuration of an acquisition unit.

The acquisition unit 210 acquires the content items associated with the state information records from the content distribution server 30. More specifically, the acquisition unit 210 acquires the content items in the following manner. FIG. 5 is a diagram illustrating in detail an example functional configuration of the acquisition unit 210. As illustrated in FIG. 5, the acquisition unit 210 includes a content-list acquisition unit 211, a request unit 212, and a content acquisition unit 213.

Figure 6:
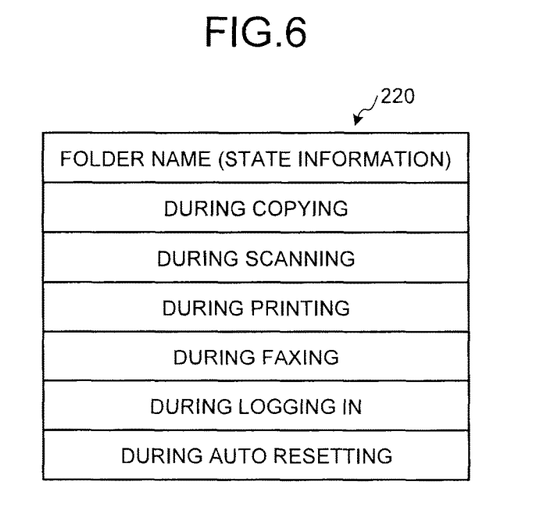
FIG. 6 is a diagram schematically illustrating an example of information stored in a storage unit.

The content-list acquisition unit 211 sends a state information record to the content distribution server 30 and acquires, as a response thereto, a content list from which one or more content items associated with the state information record can be identified. More specifically, in this example, the content-list acquisition unit 211 sends one of folder names (one of the state information records) stored in advance in the storage unit 220 as illustrated in FIG. 6 to the content distribution server 30 using an HTTP (hypertext transfer protocol) request. Upon receiving the folder name, the content distribution server 30 transmits a content list, from which a content item(s) contained in a folder specified by the received folder name can be identified, to the MFP 1. The content-list acquisition unit 211 thus acquires the content list. In this example, the content list is information containing names (content names) of the one or more content items stored in the folder. However, the content list is not limited thereto. The content-list acquisition unit 211 sends each of the folder names stored in advance in the storage unit 220 to the content distribution server 30 in a similar manner. In response thereto, the content distribution server 30 transmits a plurality of content lists that are in one-to-one correspondence, respectively, with all of the folder names (the state information records) to the MFP 1. In this manner, the content-list acquisition unit 211 acquires the content lists that are in one-to-one correspondence, respectively, with all of the folder names stored in the storage unit 220 in advance.

Figure 7:
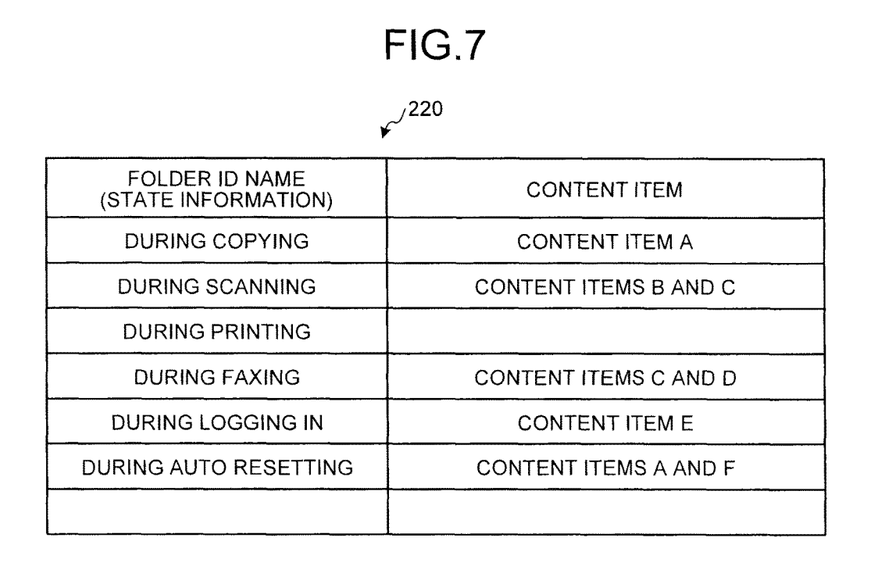
FIG. 7 is a diagram schematically illustrating an example of information stored in the storage unit.
Figure 8:
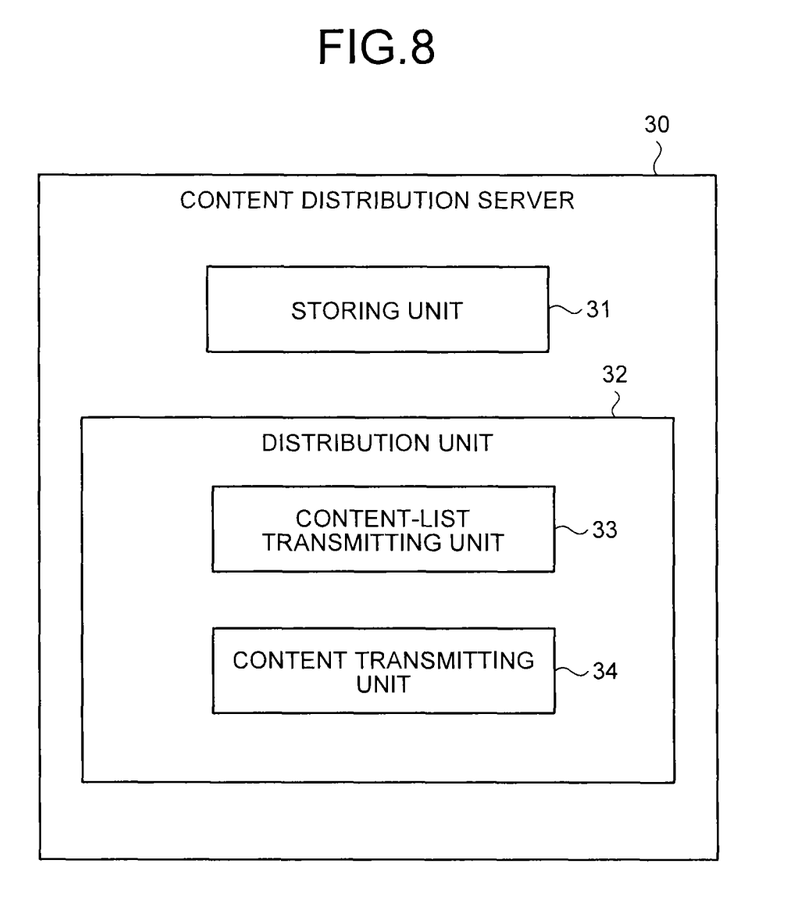
FIG. 8 is a diagram illustrating an example functional configuration of the content distribution server.

The request unit 212 requests for the content item(s) identified from the content list. In this example, the request unit 212 designates content name(s) contained in the content list acquired by the content-list acquisition unit 211, and requests the content distribution server 30 to download the content item(s) specified by the content name(s). Upon receiving the request, the content distribution server 30 transmits the download-requested content item(s) to the MFP 1. The content acquisition unit 213 acquires the content item(s) (the content item(s) requested by the request unit 212). The content acquisition unit 213 stores the acquired content item(s) as being associated with the state information record in the storage unit 220. In this example, the request unit 212 and the content acquisition unit 213 perform the process described above for each of the plurality of content lists that are in one-to-one correspondence, respectively, with all of the state information records (the plurality of state information records stored in the storage unit 220 in advance). In this manner, as illustrated in FIG. 7, the storage unit 220 stores the content items acquired by the acquisition unit 210 as being associated with the plurality of state information records on the per-state-information-record basis FIG. 8 is a diagram illustrating an example functional configuration of the content distribution server 30 configured to distribute content items to the MFP 1. For convenience of description, FIG. 8 mainly illustrates functions relevant to aspects of the present invention; however, functions of the content distribution server 30 are not limited thereto.

As illustrated in FIG. 8, the content distribution server 30 includes the above-described storing unit 31 and a distribution unit 32. The distribution unit 32 performs control for distributing one or more content items of the content items held in the storing unit 31 to the MFP 1 in response to a request from the MFP 1. In the embodiment, the distribution unit 32 includes a content-list transmitting unit 33 and a content transmitting unit 34. The content-list transmitting unit 33 has a function of transmitting a content list from which one or more content items, which are associated with a state information record sent from the MFP 1, of the content items held in the storing unit 31 can be identified to the MFP 1. The content transmitting unit 34 has a function of transmitting the content item(s) requested from the MFP 1 to the MFP 1.

The content distribution server 30 is implemented in a computer device including a CPU, a storage device such as a ROM and a RAM, and a communication I/F for carrying out communications with the MFP 1 and the like. The above-described functions of the units (e.g., the distribution unit 32) of the content distribution server 30 are performed by the CPU by executing program instructions stored in the storage device. However, a configuration for performing the functions is not limited thereto. For example, the functions of the content distribution server 30 may be wholly or partially implemented in a dedicated hardware circuit (e.g., a semiconductor integrated circuit). The storing unit 31 may be implemented in, for example, a ROM or an external storage device (e.g., HDD).

Figure 9:
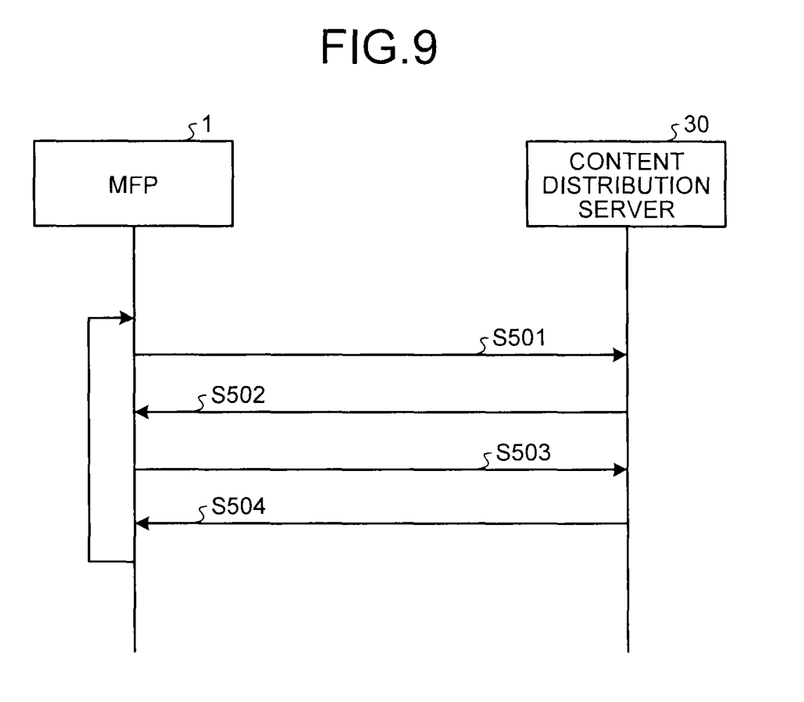
FIG. 9 is a sequence diagram illustrating an example of procedure of how the MFP acquires content items.

FIG. 9 is a sequence diagram illustrating an example of procedure of how the MFP 1 acquires content items from the content distribution server 30. As illustrated in FIG. 9, the MFP 1 sends any one of the plurality of folder names (state information records) stored in the storage unit 220 in advance to the content distribution server 30 (S501). Upon receiving the folder name, the content distribution server 30 transmits a content list, from which a content item(s) stored in the received folder name can be identified, to the MFP 1 (S502). Upon acquiring the content list, the MFP 1 designates a content name(s) contained in the content list and requests the content distribution server 30 to download the content item(s) specified by the content name(s) (S503). Upon receiving the request, the content distribution server 30 transmits the download-requested content item(s) to the MFP 1 (S504). The MFP 1 stores the content item(s) acquired from the content distribution server 30 as being associated with the folder name in the storage unit 220. The procedure from S501 to S504 is repeatedly performed until all content items associated with the respective folder names have been acquired.

Referring back to FIG. 4, the functions are further described below. The display control unit 230 performs control of displaying a content item(s) associated with a state information record indicating a current state of the MFP 1. More specifically, the display control unit 230 performs control of selecting, from the content items stored in the storage unit 220, a content item(s) associated with the state information record indicating the current state of the MFP 1 as a content item(s) to be displayed, and displaying the selected content item(s). In the embodiment, the display control unit 230 performs control of selecting, from the content items stored in the storage unit 220 as being associated with the respective folders, a content item(s) associated with a folder indicating a current state of the MFP 1 and displaying the selected content item(s) on the operation panel 27. The storage unit 220 may be implemented in the flash memory 24, for example. The current state of the MFP 1 depends on a user operation or an operation performed by the MFP 1.

Meanwhile, the state information record can be considered as information indicating the user operation or the operation performed by the MFP 1. In the embodiment, it is assumed that the display control unit 230 displays the content item(s) on the operation panel 27 in the following instances:

(1) when a user operation corresponding to a command to perform copying is accepted by the operating unit 20 ("during copying"),
(2) when a user operation corresponding to a command to perform scanning is accepted by the operating unit 20 ("during scanning"),
(3) when the MFP 1 starts an image printing process ("during printing"),
(4) when a user operation corresponding to a command to perform faxing is accepted by the operating unit 20 ("during faxing"),
(5) when a user starts a login process on the operating unit 20 ("during logging in"), and
(6) when the MFP 1 starts an automatic reset process ("during auto resetting"). The automatic reset process is an operation of initializing an operation screen of the MFP 1 (hereinafter, "operation screen") after lapse of a predetermined time since when a user stops some operation on the operation screen or since when a job involving the MFP 1 ends.

For example, when a user operation corresponding to "command to perform copying" is accepted by the operation unit 20, a state information record indicating a current state of the MFP 1 changes to "during copying". Accordingly, the display control unit 230 acquires the "content item A", which is stored in the storage unit 220 as being associated with "during copying", from the storage unit 220 and displays the "content item A" on the operation panel 27.

If a plurality of content items are associated with a state information record (folder name) stored in the storage unit 220, the content items can be displayed in the following manner. After one of the content items is displayed on the operation panel 27 for a predetermined duration, a next one of the content items is displayed for the same duration. As described above, a user can assign different content item(s) to information indicating "during copying" and to information indicating "during scanning", so that content items that are more beneficial for the user are displayed. As a matter of course, the instances in which the content items are to be displayed on the operation panel 27 are not limited to the above-described instances (1) through (6).

As described above, in the embodiment, the content distribution server 30 includes the storing unit 31 that stores content items in such a manner that one or more content items are associated with each of state information records identifying a state of the MFP 1. The MFP 1 includes the acquisition unit 210 that acquires the content items associated with the state information records from the content distribution server 30 and the display control unit 230 that performs control of displaying a content item(s) associated with a state information record indicating a current state of the MFP 1. The above configuration allows implementing a mechanism that distributes and displays a content item(s) that varies depending on a state of the MFP 1.

In the embodiment described above, the main body 10 and the operating unit 20 operate on distinct operating systems independently of each other. However, the configuration of the main body 10 and the operating unit 20 is not limited thereto. Alternatively, the main body 10 and the operating unit 20 may be configured to operate on a same operating system.

The program instructions to be executed by the MFP 1 according to the embodiment may be configured to be provided as being recorded in a non-transitory computer-readable recording medium, such as a CD-ROM, an FD (flexible disk), a CD-R, a DVD (digital versatile disk), or USB, in an installable or executable format. Alternatively, the program instructions may be configured to be provided or distributed over a network such as the Internet. The program instructions may be configured to be provided as being stored in advance in a ROM or the like.

According to an aspect of the present invention, different content items can be distributed depending on a state of equipment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system comprising:
a server configured to distribute content items; and
an image forming apparatus, wherein
the server includes
a memory configured to store, for each of state information identifying a state of the image forming apparatus, one or more of the content items that are associated with the state information, the state information corresponding to at least one of a state during copying, a state during scanning, a state during printing, and a state during faxing, and
the image forming apparatus includes
an operation panel, and
circuitry configured to
transmit, to the server, the state information,
acquire the one or more content items associated with the state information from the server, and
perform control of displaying, on the operation panel, the one or more content items associated with the state information indicating a current state of the image forming apparatus, of the at least one of the state during copying, the state during scanning, the state during printing, and the state during faxing, the content items being information to be notified to a user of the image forming apparatus and including at least one of advertisement, in-house notices, and information about the image forming apparatus.

2. The system according to claim 1, wherein the circuitry is further configured to
send the state information to the server and acquire, as a response thereto, a content list, the content list allowing identifying one or more content items associated with the state information,
request for the content items identified from the content list, and
acquire the content items requested.

3. The system according to claim 1, wherein the image forming apparatus further comprises an apparatus memory configured to store the one or more content items acquired by the circuitry, the one or more content items being associated with the state information, and the circuitry performs control of selecting, from the one or more content items stored in the apparatus memory, the one or more content items associated with the state information as the content items to be displayed, and displaying the selected one or more content items.

4. The system according to claim 1, wherein the memory comprises a plurality of folders in a one-to-one correspondence with a plurality of the state information and stores, in the folders, one or more content items corresponding to the state information.

5. An image forming apparatus comprising:
an operation panel; and
circuitry configured to
   transmit, to a server, state information indicating a current state of the image forming apparatus,
   acquire, from a memory storing, for each of the state information, one or more content items associated with the state information, the state information corresponding to at least one of a state during copying, a state during scanning, a state during printing, and a state during faxing, and
   perform control of displaying, on the operation panel, the one or more content items associated with the state information, of the at least one of the state during copying, the state during scanning, the state during printing, and the state during faxing, the content items being information to be notified to a user of the image forming apparatus and including at least one of advertisement, in-house notices, and information about the image forming apparatus.

6. The image forming apparatus according to claim 5, further comprising
an apparatus memory configured to store the one or more content items acquired by the circuitry, the one or more content items being associated with the state information, wherein
the circuitry performs control of selecting, from the one or more content items stored in the apparatus memory, the one or more content items associated with the state information as the content items to be displayed, and displaying the selected one or more content items.

7. A method comprising:
transmitting, to a server, state information indicating a current state of an image forming apparatus
acquiring, using circuitry, from a memory storing, for each state information, one or more content items associated with the state information, the state information corresponding to at least one of a state during copying, a state during scanning, a state during printing, and a state during faxing; and
performing, using the circuitry, control of displaying, on an operation panel of the image forming apparatus, the one or more content items associated with the state information, of the at least one of the state during copying, the state during scanning, the state during printing, and the state during faxing, the content items being information to be notified to a user of the image forming apparatus and including at least one of advertisement, in-house notices, and information about the image forming apparatus.

8. The system according to claim 1, wherein
a first content item associated with a first of the state during copying, the state during scanning, the state during printing, and the state during faxing, is different than a second content item associated with a second of the state during copying, the state during scanning, the state during printing, and the state during faxing, and
a third content item is associated with a third and a fourth of the state during copying, the state during scanning, the state during printing, and the state during faxing.

9. The system according to claim 1, wherein a content item associated with one of the state during copying, the state during scanning, the state during printing, and the state during faxing is different than a content item associated with another one of the state during copying, the state during scanning, the state during printing, and the state during faxing.

10. The system according to claim 1, wherein the server is external to the image forming apparatus.

11. The system according to claim 1, wherein the memory comprises a plurality of folders in a one-to-one correspondence with a plurality of the state information and stores, in each state-corresponding folder, one or more content items corresponding to the state information.

12. The system according to claim 1, wherein the circuitry of the image forming apparatus is further configured to display the content items in such a manner that after one of the content items is displayed on the operation panel for a predetermined duration, a next one of the content items is displayed, in response to a plurality of content items being associated with the state information stored in the memory.

* * * * *